(12) United States Patent
Cho

(10) Patent No.: US 10,061,690 B2
(45) Date of Patent: Aug. 28, 2018

(54) COMPUTING DEVICE AND METHOD FOR PERFORMING TEST OF REHOSTING

(71) Applicant: TmaxSoft Co., Ltd., Gyeonggi-do (KR)

(72) Inventor: ByoungGeol Cho, Gyeonggi-do (KR)

(73) Assignee: TMAXSOFT CO., LTD. (KR)

( * ) Notice: Subject to any disclaimer, the term of this patent is extended or adjusted under 35 U.S.C. 154(b) by 70 days.

(21) Appl. No.: 15/215,833

(22) Filed: Jul. 21, 2016

(65) Prior Publication Data

US 2018/0004646 A1 Jan. 4, 2018

(30) Foreign Application Priority Data

Jun. 29, 2016 (KR) ........................ 10-2016-0081885

(51) Int. Cl.
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............ G06F 11/0748; G06F 11/0751; G06F 11/3692; G06F 11/3684; G06F 11/3688; G06F 11/366; G06F 11/3672; G06F 11/0778; G06F 11/3608
See application file for complete search history.

(56) References Cited

U.S. PATENT DOCUMENTS

| 6,654,950 | B1* | 11/2003 | Barnishan | G06F 8/20 717/136 |
| 7,032,214 | B1* | 4/2006 | Rodrigues | G06F 11/3419 702/186 |
| 7,490,319 | B2* | 2/2009 | Blackwell | G06F 11/3664 717/124 |
| 8,117,606 | B2* | 2/2012 | Chakrabarti | G06F 8/433 717/152 |
| 8,881,139 | B1* | 11/2014 | Acacio | G06F 17/303 717/140 |
| 2005/0039173 | A1* | 2/2005 | Tondreau, Jr. | G06F 8/45 717/136 |

(Continued)

FOREIGN PATENT DOCUMENTS

| JP | 2007-011690 | 1/2007 |
| JP | 2008-197897 | 8/2008 |

(Continued)

OTHER PUBLICATIONS

Kim, G., "Study on Test Case for Validation of Real Time Transactions Based on Financial Added Value Network Environment", Master's Thesis, Hongik University, 2011.

(Continued)

*Primary Examiner* — Nadeem Iqbal
(74) *Attorney, Agent, or Firm* — Fish IP Law, LLP

(57) ABSTRACT

Disclosed is a method for performing a test of rehosting performed by a computing device including one or more processors and a memory storing commands executable by the processors. The method may include: generating, by a test case generating module, a test case by analyzing a programming code of a legacy system; performing, by a test runner module, the test case in the legacy system and an open system; and comparing, by a test result generating module, execution results of the test case in the legacy system and the open system.

9 Claims, 5 Drawing Sheets

(56) References Cited

U.S. PATENT DOCUMENTS

| | | | |
|---|---|---|---|
| 2005/0138603 A1* | 6/2005 | Cha | G06F 8/53 717/120 |
| 2007/0067756 A1* | 3/2007 | Garza | G06F 8/10 717/136 |
| 2012/0296853 A1 | 11/2012 | Galloway et al. | |
| 2016/0092330 A1 | 3/2016 | Kosuda et al. | |

FOREIGN PATENT DOCUMENTS

| | | |
|---|---|---|
| KR | 100869886 B1 | 11/2008 |
| KR | 10-2016-0044305 | 4/2016 |

OTHER PUBLICATIONS

Korean Application No. 10-2016-0081885, Office Action dated Apr. 14, 2017.

* cited by examiner

COMPUTING DEVICE AND METHOD FOR PERFORMING TEST OF REHOSTING

CROSS-REFERENCE TO RELATED APPLICATIONS

This application claims priority to and the benefit of Korean Patent Application No. 10-2016-0081885 filed in the Korean Intellectual Property Office on Jun. 29, 2016, the entire contents of which are incorporated herein by reference.

TECHNICAL FIELD

The present disclosure relates to rehosting, and more particularly, to a method, a computing device and a computer program for performing a test of rehosting.

BACKGROUND ART

In the related art, a mainframe system is used for processing data of an enterprise. The mainframe system as an industrial term calling a large-sized computer manufactured in a large company such as IBM is primarily used in a computing business required for enterprise activities of companies such as major companies or financial institutions and is configured by a centralization scheme rather than a distributed computing scheme.

The mainframe system is prepared by Cobol which is a programming language in the 1950s, and the like and manpower which can maintain and manage the mainframe system is concentrated in the IBM, and the like, and as a result, maintenance cost is very high. The mainframe system is a high-cost structure which rapidly increases every year and a cost burden of the mainframe system grows heavier, and as a result, in recent years, the mainframe system has been used while being replaced with an open system designed to enable hardware and software of different computer manufacturers to be linked with each other, for example, UNIX, Linux, or Windows.

Rehosting represents reconstructing hardware (H/W) and software (S/W) in a mainframe system environment processing the data of the enterprise under an open system environment and switching a database (including a general file) into the open system environment. The rehosting has an advantage in that the rehosting can be implemented with low cost by reusing an application program and the open system has lower maintenance cost than the mainframe system.

However, when the mainframe system is rehosted to the open system, all businesses performed in the main frame system need to be tested and more time is substantially required in testing an operation than constructing the open system in a rehosting project. Therefore, there may be a demand for a solution for easily performing a required test after constructing the mainframe system as the open system in a rehosting business world.

Prior Art Document: Korean Patent Registration No. 10-0869886 (Nov. 14, 2008).

SUMMARY OF THE INVENTION

The present disclosure has been made in an effort to rehost a mainframe system to an open system.

The present disclosure has also been made in an effort to provide a solution for performing a test after constructing the mainframe system to the open system.

An exemplary embodiment of the present disclosure provides a method for performing a test of rehosting performed by a computing device including one or more processors and a memory storing commands executable by the processors. The method may include: generating, by a test case generating module, a test case by analyzing a programming code of a legacy system; performing, by a test runner module, the test case in the legacy system and an open system; and comparing, by a test result generating module, execution results of the test case in the legacy system and the open system.

In the exemplary embodiment, the generating of the test case may include extracting, by the test case generating module, one or more transactions performed by the legacy system by analyzing the programming code of the legacy system, and generating, by the test case generating module, the test case by mapping respective input values to the respective transactions.

In the exemplary embodiment, the input value may be extracted from a database based on a type of the transaction.

In the exemplary embodiment, the generating of the test case may further include generating, by the test case generating module, a state tree including one or more states based on the one or more transactions.

In the exemplary embodiment, the generating of the test case may further include generating notification information which allows a user to determine whether only a state is compared in a result comparison step with respect to a transaction in which a predetermined result is output when performing the transaction based on a type of the transaction.

In the exemplary embodiment, the performing of the test case in the legacy system and the open system may include performing, by the test runner module, the transaction by calling the transaction to the legacy system and inputting the input value in the called transaction, and performing, by the test runner module, the transaction by calling the transaction to the open system and inputting the input value in the called transaction.

In the exemplary embodiment, the method may further include: providing, by a test case progressing module, information on the test case to be performed based on the state to the test runner module, wherein the performing of the test case in the legacy system and the open system may be performed by the test runner module based on information on the test case provided by the test case progressing module.

In the exemplary embodiment, the comparing of the execution results of the test case may include receiving the execution results of the test case from the legacy system and the open system, respectively, recognizing one or more fields which are able to include data in the respective execution results, and comparing the data included in the fields for each field.

In the exemplary embodiment, the comparing of the execution results of the test case may include receiving the execution results of the test case from the legacy system and the open system, respectively, and comparing the states in the respective execution results with respect to the transaction in which the predetermined result is output when performing the transaction included in the test case.

In the exemplary embodiment, the method may further include generating result notification information for the corresponding test case to be provided to the user when results of comparing the execution results of the test case do not coincide with each other.

In the exemplary embodiment, the generating of the notification information may include mapping and storing the execution results of the test case in the legacy system and the open system and the test case.

Another exemplary embodiment of the present disclosure provides a computing device for performing a test of rehosting. The computing device may include: one or more processors; and a memory storing commands executable in the one or more processors, wherein the one or more processors may include a test case generating module generating a test case by analyzing a programming code of a legacy system, a test runner module providing a virtual interface capable of calling the legacy system and an open system and performing the test case in the legacy system and the open system, and a test result generating module comparing execution results of the test case in the legacy system and the open system.

Yet another exemplary embodiment of the present disclosure provides a computer program stored in a non-transitory computer readable storage medium, which includes a plurality of commands executed by one or more processors of a computing device. The computer program stored in the non-transitory computer readable storage medium may include: a command for generating, by a test case generating module, a test case by analyzing a programming code of a legacy system; a command for performing, by a test runner module, the test case in the legacy system and an open system; and a command for comparing, by a test result generating module, execution results of the test case in the legacy system and the open system.

According to exemplary embodiments of the present disclosure, a mainframe system can be rehosted to an open system.

A solution for performing a test after constructing the mainframe system to the open system can be provided.

DETAILED DESCRIPTION

Figure 1:
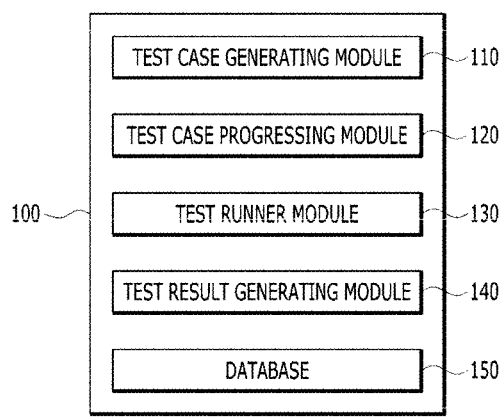
FIG. 1 is a block diagram of a computing device for performing a test of rehosting according to an exemplary embodiment of the present disclosure.

Various exemplary embodiments will now be described with reference to the drawings and similar reference numerals are used to represent similar elements throughout the drawings. In the present specification, various descriptions are presented to provide appreciation of the present disclosure. However, it is apparent that the embodiments can be executed without the specific description. In other examples, known structures and apparatuses are presented in a block diagram form in order to facilitate description of the embodiments.

"Component", "module", "system", and the like which are terms used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data through other system and a network such as the Internet through data and/or a signal from one component that interacts with other components in a local system and a distribution system) having one or more data packets, for example.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

FIG. 1 is a block diagram of a computing device for performing a test of rehosting according to an exemplary embodiment of the present disclosure.

The computing device 100 performing the test of the rehosting according to the exemplary embodiment of the present disclosure may include one or more processors (not illustrated) and a memory (not illustrated) storing commands which may be executed by the processor. Further, one or more processors of the computing device 100 may include a test case generating module 110, a test case progressing module 120, a test runner module 130, a test result generating module 140, and a database 150. The computing device 100 according to the exemplary embodiment of the present disclosure may include all kinds of computer devices including a personal computer (PC), a notebook, a mobile terminal, a smart phone, a tablet PC, a server computer, and the like.

A legacy system 1 according to the exemplary embodiment of the present disclosure may include programs (s/w) prepared by a Cobol programming language and a mainframe system (h/w). An open system according to the exemplary embodiment of the present disclosure may include an open system such as UNIX, Linux, or Windows. The legacy system 1 may be driven as a virtual machine of the computing device implemented as the open system through the rehosting for an operation test.

The test case generating module 110 may generate a test case by analyzing a programming code of the legacy system 1. The legacy system 1 may be configured by, for example, the Cobol programming language and the Cobol programming language may be configured by a predetermined grammar. The test case generating module 110 analyzes the programming code of the legacy system 1 to extract a part associated with a transaction and a screen and analyzes the corresponding part to extract for which business the corresponding transaction is and which input value is required. For example, receive map of the Cobol programming language may represent on which business screen data is input and send map may represent a next business screen after processing the data. The test case generating module 110 may generate the test case by analyzing the programming code. The test case may be constituted by the transaction and the input value mapped to the transaction as described below and generated in the test case generating module 110 and stored in the database 150.

The test case generating module 110 may extract one or more transactions performed by the legacy system 1 by analyzing the programming code of the legacy system 1. The one or more transactions include a transaction associated with a business performed by the legacy system 1 and for example, in the case of the legacy system 1 used in a banking business, businesses including log-in, account transfer, and the like may be included in the transaction. The test case generating module 110 may generate the test case by mapping the respective input values to the respective transactions. Herein, the input value may be extracted from the database based on a type of transaction. For example, when the transaction normally logs in, the test case generating module 110 extracts an ID and a password from the database 150 and maps the extracted ID and password to the transaction to generate the test case for the "normal log-in" transaction. Further, the test case generating module 110 may generate the test case for the abnormal log-in transaction having no ID by mapping an ID which is not present in the database to the abnormal log-in transaction. Detailed disclosure of the transaction and the input value is just an example and the present disclosure is not limited thereto.

Figure 2:
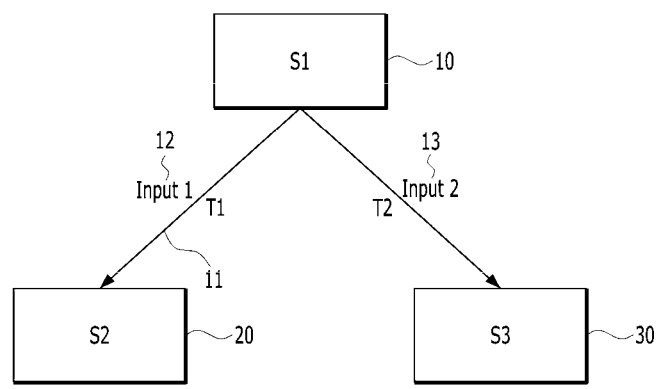
FIG. 2 is a schematic view illustrating a state tree according to an exemplary embodiment of the present disclosure.

The test case generating module 110 may generate a state tree including one or more states based on one or more transactions. For example, in a schematic view of FIG. 2, a next state of a log-in standby state 10 may be a log-in completion state 20 or a log-in failure state 30 according to the transaction. The log-in standby state may be the log-in completion state 20 when normal log-in ID and password are input (in a test case where transaction T1 11 and input value 1 12 are mapped) and the log-in standby state may be the log-in failure state when an abnormal ID, and the like are input (in a test case where transaction T2 13 and input value 2 14 are mapped). Detailed disclosure of the transaction and the state is just an example and the present disclosure is not limited thereto.

The test case generating module 110 may generate notification information which allows a user to determine whether only a state is compared in a result comparison step with respect to a transaction in which a predetermined result is output when performing the transaction based on a type of the transaction. The predetermined result may relate to a case in which different results are necessarily output according to whether a main agent performing the transaction is the legacy system 1 or the open system 2. For example, in the case where the test runner module 130 performs a transaction outputting a current time in the legacy system 1 and in the case where the test runner module 130 performs the transaction in the open system 2, a time which is not identical may be output due to a difference in times of calling both systems. However, in this case, the transaction which outputs the current time may be normally performed at both the legacy system and the open system. Therefore, when this is recorded as a test error, an unnecessary error increases, thereby causing an examiner reading the test result to be confused. Therefore, in this case, the user may configure that the legacy system and the open system similarly operate to be determined according to changing the state to the state in which the current time is output with respect to the transaction in the test result generating module 140 and the test case generating module 110 may generate the notification information so that the user performs the configuration. Detailed disclosure of the predetermined result is just an example and the present disclosure is not limited thereto.

The test case generating module 110 makes all transactions, which may be performed in the legacy system by analyzing the programming code of the legacy system, be included in the test case. When a person generates the test case, the person who performs a business associated with the corresponding transaction needs to generate the test case based on an experience associated with the business and in the case of a person who does not determine all businesses, some transactions may be omitted and in this case, the some transactions are not tested, and as a result, there is a problem in that maintenance cost may be generated later. However, in an exemplary embodiment of the present disclosure, the test case is generated by analyzing the programming language with the computer system to generate the test case with respect to the transactions in all cases without the omitted transactions, and as a result, a more perfect test is performed, thereby epochally reducing the maintenance cost later.

The test case progressing module 120 provides information on the test case to be performed based on the state to the test runner module 130 to allow the test runner module 130 to perform the test cases for all transactions. The test case progressing module 120 may derive a sequence in which the test cases are to be performed through information on the state tree, information on the state, information on the transaction, and information on the input value, and as a result, the transactions for all businesses may be tested by controlling the test runner module 130. For example, the test case progressing module 120 may determine an execution sequence of the test cases by referring to a transaction connecting the state tree illustrated in FIG. 2 and respective nodes of the state and the input value which matches the transaction. In more detail, the test case progressing module 120 may determine to test operation of the transaction associated with the abnormal log-in after testing the operation of the transaction associated with the normal log-in in testing a "log-in" business based on information on the log-in standby state 10, and the log-in completion state 2 and the log-in failure state 30 which are states subsequent thereto. In this case, in a current state (in the aforementioned example, the log-in state 10), the test case progressing module 120 provides the transaction 11 associated with the normal log-in and the mapped input value 1 12 to the test runner module 130 to allow the test runner module 130 to test the transaction associated with the normal log-in. Further, after performing the test associated with the normal log-in (for example, the test case progressing module 120 determines the current state as the log-in completion state 20), the test case progressing module 120 provides the input value 2 14 mapped with the transaction 13 associated with the abnormal log-in to the test runner module 130 so as to test the transaction associated with the log-in failure to allow the test runner module 130 to perform the transaction associated with the abnormal log-in. The test case progressing module 120 provides information on the test case to be performed later based on the current state and the next state to the test runner module 130 to allow the test runner module 130 to perform the test case by calling the legacy system 1 and the open system 2.

The test case progressing module 120 controls a test case progress sequence of the test runner module 130 through information on all test cases to test transactions associated with all businesses items and prevents the test associated with the transaction from being omitted to reduce the maintenance cost due to an imperfect test.

The test runner module 130 may perform the test case in the legacy system 1 and the open system 2. The legacy system 1 may be implemented as a virtual machine on a computer of the open system 2. The test runner module 130 allows the legacy system 1 to perform the corresponding transaction in the legacy system 1 by inputting the input value in the transaction by calling the legacy system 1 to perform the test. The test runner module 130 may perform the transaction by calling the transaction to the legacy system 1 and inputting the input value in the called transaction. The test runner module 130 may perform the transaction by calling the transaction to the open system and inputting the input value in the called transaction. For example, the test runner module 130 calls the transaction associated with the log-in to the legacy system and the open system in order to perform the test associated with the normal log-in and inputs normal input values extracted from user ID and PW databases to perform the test case associated with the normal log-in in the legacy system and the open system. After the corresponding transaction is tested, the test runner module 130 receives information associated with a next transaction and a next input value from the test case progressing module 120 to perform a next test case. For example, after the test associated with the normal log-in is performed, the test runner module 130 is instructed to perform the test associated with the abnormal log-in from the test case progressing module 120 to perform the test associated with the abnormal log-in. The test runner module 130 calls the corresponding transaction and inputs the input value mapped to the corresponding transaction to allow the test case to be performed on the respective systems. The test which performs the operation performed on both computer systems of the legacy system and the open system is necessarily performed on the computer until the input of the input value, and the call and result derivation of the transaction.

Figure 3:
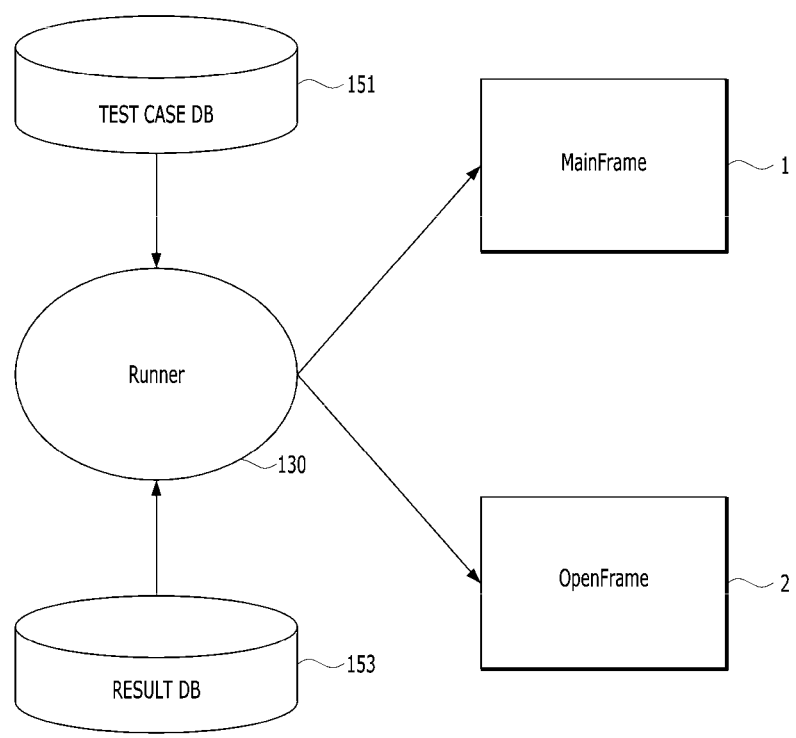
FIG. 3 is a conceptual view illustrating that a test case is performed according to an exemplary embodiment of the present disclosure.

As illustrated in FIG. 3, the test runner module 130 receives the transaction and the input value mapped to the transaction from the test case database 151 to perform the test by calling the transaction to the legacy system and the open system and inputting the input value. A result of the performed test is stored in the result database 153 to be provided to the user so that the user recognizes and modifies a part which is problematic.

When the rehosting is normally performed, an execution result of the legacy system 1 and an execution result of the open system 2 for the test case are the same as each other. However, when the rehosting is not normally performed, the execution result of the legacy system 1 and the execution result of the open system 2 for the test case may be different from each other and the transaction associated with the test case needs to be modified. Therefore, the test result generating module 140 compares the execution results of the test case for the respective systems and when the execution results do not coincide with each other, the test result generating module 140 may generate the information on the corresponding test case and transaction.

The test result generating module 140 may compare the execution results of the test case in the legacy system 1 and the open system 2. The test result generating module 140 may receive the execution results of the test case from the legacy system 1 and the open system 2, respectively. The test result generating module 140 may recognize one or more fields which may include the data in the respective execution results. The test result generating module 140 compares the data including the data included in the fields for each field to generate a test result indicating whether the legacy system and the open system similarly operate. When the legacy system 1 and the open system 2 perform the same business, the same result screen may be output. The test result generating module 140 divides the fields in which the data may be input on the result screen, and the like and compares the data in the respective fields with each other to determine whether an operating result of the legacy system 1 and an operating result of the open system 2 coincide with each other according to a test result. For example, when the test case associated with the abnormal log-in is performed, an input window of the ID and the PW may be output in order to request the normal log-in to the user. In this case, the test result generating module 140 may recognize the ID and PW input window in the output including the ID and PW input window in the legacy system and may generate the test result by comparing which format of data the corresponding field may receive or which data the corresponding field includes with the ID and PW input window identified in the output in the open system and which format of data the input window may receive or which data the input windows include.

The test result generating module 140 may generate the test result by comparing states in the respective execution results for the transactions in which a predetermined result is output at the time of performing the transaction included in the test case. As described above, the predetermined result may relate to a case in which different results are necessarily output according to whether a main agent performing the transaction is the legacy system 1 or the open system 2. For example, the test result generating module 140 may generate the test result indicating that the system normally operates even though some data values of the data field are different from each other when the result of the transaction outputs the current time even though the results of the transactions performed by both the systems output different times (e.g., a difference due to a difference in response speed, and the like) at the time of generating the test result for the test case associated with the transaction outputting the current time. Detailed disclosure of the predetermined result is just an example and the present disclosure is not limited thereto.

The test result generating module 140 compares the execution results of the test case and when the execution results do not coincide with each other, the test result generating module 140 may generate result notification information regarding the corresponding test case to be provided to the user. The test result generating module 140 records information on the test case in which the execution results do not coincide with each other, information on the corresponding transaction, information on the input value, and information on the state to generate the notification information. Further, the test result generating module may map the execution results of the test cases on the legacy system and the open system and the test cases and store the mapped execution results and test cases. For example, the test case associated with the log-in is performed, but when the execution results are different from each other, the test result generating module 140 obtains an image associated with the execution result of the test case (e.g., screen capture, and the like) and maps the images and the test case to generate the mapped image and test case as a separate file. Detailed disclosure of the notification information is just an example and the present disclosure is not limited thereto.

The database 150 may store overall information for the operation test of the rehosting. For example, the database 150 may store information on the test case, information on the input value which may be used in the test case, information on the transaction to be performed in the test case, information on the state in which the transaction is performed, information on the state tree, information on the test execution result, and test execution result and notification information, and the like. The database 150 in the present disclosure may include both a database computing device itself or a memory capable of storing the data.

In testing the rehosting, the rehosting which is used for substituting a mainframe computer which forms a backbone of a huge company with the open system is very important because all business performed by the company may be permanently performed even though a system environment is changed. Further, in the test, since all operations need to be tested, it is very important to test all operations without omission.

The computing device for testing the rehosting according to the exemplary embodiment of the present disclosure may generate the test cases corresponding to all cases by analyzing (e.g., compiling) the code of the legacy system with a grammar of the computing device, which needs to be necessarily performed by the computing device and control all of the generated test cases to be performed. Further, the generated test cases are automatically performed on the computer to achieve omission prevention of the test, which is a most important element in the test. A result of the executed test is necessarily compared and generated through a method which may be performed on the computer to allow the user to easily verify the result of the test, and as a result, the smaller time and cost may be required for the maintenance.

Figure 4:
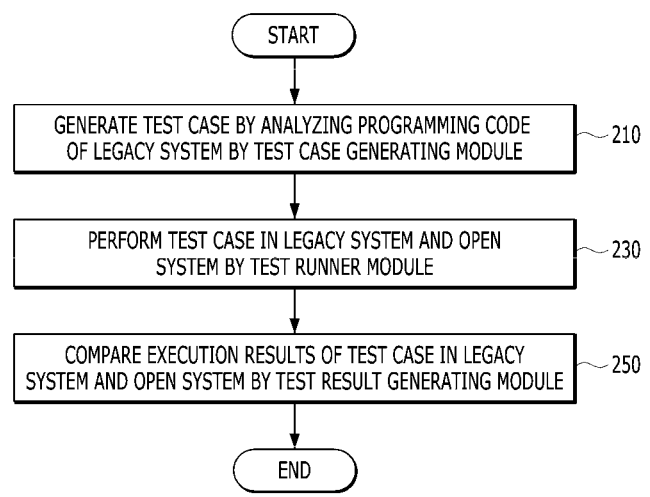
FIG. 4 is a flowchart of a method for performing a test of rehosting according to an exemplary embodiment of the present disclosure.

FIG. 4 is a flowchart of a method for performing a test of rehosting according to an exemplary embodiment of the present disclosure.

According to an exemplary embodiment of the present disclosure, in the rehosting, a method testing whether the rehosting is normally implemented may be performed in the computing device.

In the exemplary embodiment of the present disclosure, a test case generating module 110 of the computing device 100 may generate a test case by analyzing a programming code of a legacy system 1 (210). The test case may be configured by mapping one or more transactions and input values associated with the corresponding business.

In the exemplary embodiment of the present disclosure, a test runner module 130 of the computing device 100 may perform the test case in the legacy system and an open system (230). The test runner module 130 receives a control from a test case progressing module 120 to call the transactions associated with the test case to both systems and transfer the input values to the respective systems to allow the transactions for the test cases to be performed by the respective systems.

In the exemplary embodiment of the present disclosure, a test result generating module 140 of the computing device 100 may compare execution results of the test cases in the legacy system and the open system (250). The test result generating module 140 receive the execution results of the test cases from the respective systems and recognizes data files of the respective results to generate the execution result of the test case by comparing data for each of the data fields. The test result generating module 140 may generate notification information associated with the test case when the execution results of both systems do not coincide with each other.

Figure 5:
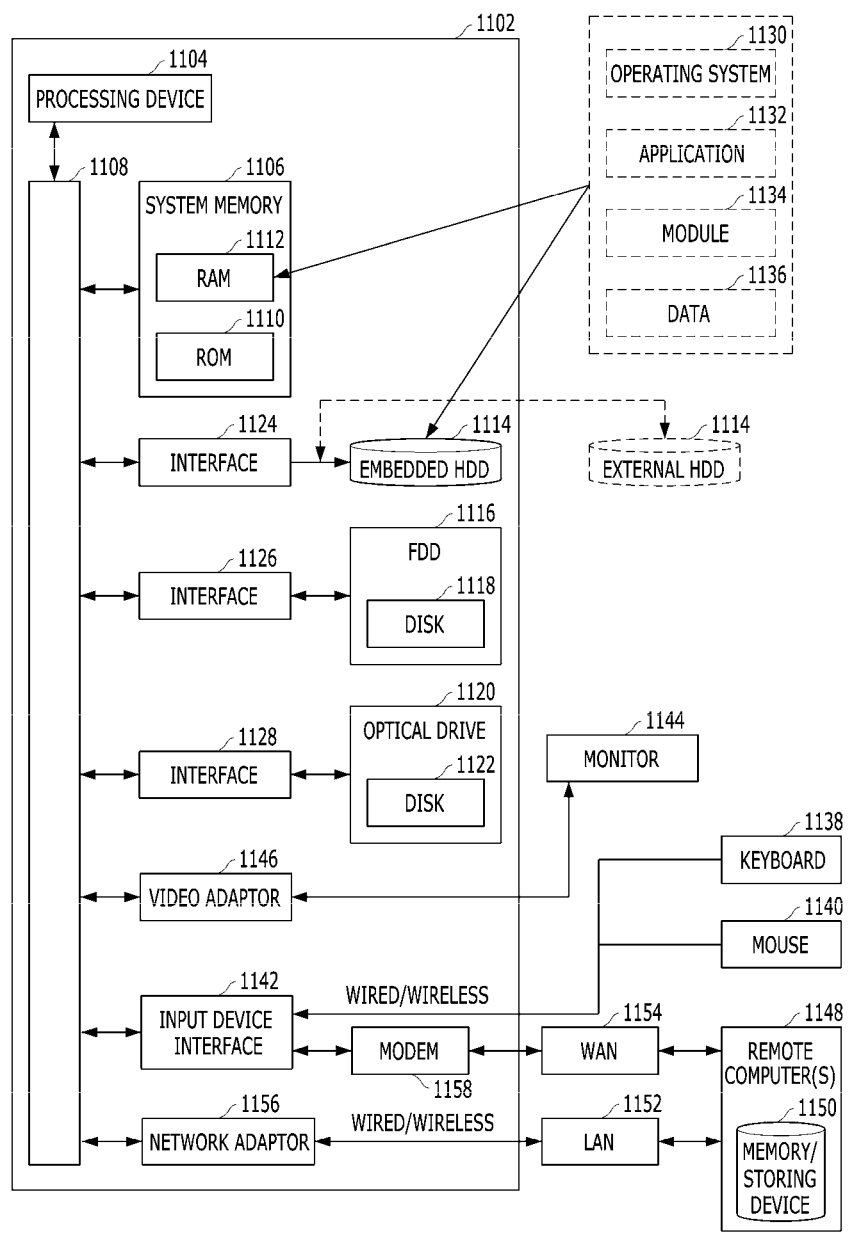
FIG. 5 is a general schematic view of an exemplary computing environment in which exemplary embodiments of the present disclosure can be implemented.

FIG. 5 is a general schematic view of an exemplary computing environment in which exemplary embodiments of the present disclosure can be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable medium may include both a computer storage medium and a communication medium. The computer storage medium includes volatile and non-volatile, temporary or non-temporary, movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing at least one of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in a range of the computer readable media.

An exemplary environment 1100 that implements various aspects of the present disclosure including a computer 1102 is shown and the computer 1102 includes a processing device 1104, a system memory 1106, and a system bus 1108.

The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computer 1102 is used in the LAN networking environment, the computer 1102 is connected to a local network (LAN) 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes Wi-Fi and a Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred to in the above description may be expressed by voltage, current, electromagnetic waves, magnetic fields, or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, posses, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in predetermined art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

What is claimed is:

1. A method for performing a rehosting test executed by a computing device including one or more processors and a memory storing commands executable by the processors, the method comprising:
    extracting, by a test case generating module, one or more transactions performed by a legacy system by analyzing grammar of programming code of the legacy system and by identifying one or more types of inputs needed for the one or more transactions, respectively, by analyzing the one or more transactions;
    generating, by the test case generating module, the test case by mapping a respective input value extracted from a database based on the one or more types of transactions, respectively, to the one or more transactions;
    generating, by the test case generating module, a state tree including one or more states, wherein the one or more states are determined based on the one or more transactions and a previous state;
    performing, by the test runner module, the test case in the legacy system by performing the transaction by calling the transaction to the legacy system and by inputting the input value in the called transaction;
    performing, by the test runner module, the test case in the open system by performing the transaction by calling the transaction to the open system and by inputting the input value in the called transaction; and
    comparing, by a test result generating module, execution results of the test case in the legacy system and the open system respectively, wherein the execution results include one or more fields containing data and the state generated by executing the test case.

2. The method of claim 1, wherein the generating of the test case further includes generating notification information which allows a user to determine whether only a state is compared in a result comparison step with respect to a transaction in which a predetermined result is output when performing the transaction based on a type of the transaction, wherein the predetermined result relates to a case in which different results are necessarily output according to whether an agent performs the transaction in the legacy system or the open system.

3. The method of claim 1, further comprising:
    determining, by a test case progressing module, an execution sequence of the test case by referring to the state tree, the transaction connecting the state included in the state tree and the input value mapped to the transaction; and
    providing, by the test case progressing module, the execution sequence of the test case to the test runner module, wherein the performing of the test case in the legacy system and the open system is performed by the test runner module based on the execution sequence of the test case provided by the test case progressing module.

4. The method of claim 1, wherein the comparing of the execution results of the test case includes
    receiving the execution results of the test case from the legacy system and the open system, respectively, recognizing one or more fields which are able to include data in the respective execution results in the legacy system and the open system, respectively, and comparing the data included in the fields for each field.

5. The method of claim 1, wherein the comparing of the execution results of the test case includes receiving the execution results of the test case from the legacy system and the open system, respectively, and comparing the states in the respective execution results with respect to the transaction in which the predetermined result is output when performing the transaction included in the test case.

6. The method of claim 1, further comprising:

generating result notification information for the corresponding test case to be provided to the user when results of comparing the execution results of the test case do not coincide with each other.

7. The method of claim 6, wherein the generating of the notification information includes mapping and storing the execution results of the test case in the legacy system and the open system and the test case.

8. A computing device for performing a test of rehosting, the computing device comprising:

one or more processors; and a memory storing commands executable in the one or more processors, wherein the one or more processors include a test case generating module configured to (a) extract one or more transactions performed by a legacy system by analyzing grammar of programming code of the legacy system and one or more types of inputs needed for the one or more transactions, respectively, by analyzing the one or more transactions, and (b) generate the test case by mapping a respective input value extracted from a database based on a type of the one or more transactions to the respective one or more transactions, and (c) generate a state tree including one or more states, wherein the one or more states are determined based on the one or more transactions and a previous state, a test runner module providing a virtual interface capable of (a) calling the legacy system and an open system and performing the test case in the legacy system and the open system and (b) perform the test case in the legacy system by calling the transaction to the legacy system and by inputting the respective input value in the called transaction and (c) perform the test case in the open system by performing the transaction by calling the transaction to the open system and by inputting the respective input value in the called transaction, and a test result generating module comparing execution results of the test case in the legacy system and the open system respectively, wherein the execution results include a field that can contain data and the state generated by executing the test case.

9. A non-transitory computer readable storage medium storing a computer program, which comprises a plurality of commands, the non-transitory computer readable medium comprising:

a computing device having one or more processors configured to execute the plurality of commands, wherein the plurality of commands comprises:

a command for extracting, by the test case generating module, one or more transactions performed by a legacy system by analyzing grammar of programming code of the legacy system and by identifying one or more types of inputs needed for the transactions respectively by analyzing the one or more transactions;

a command for generating, by the test case generating module, the test case by mapping a respective input value extracted from a database based on the type of one or more transactions respectively to the respective one or more transactions;

a command for generating, by the test case generating module, a state tree including one or more states, wherein the one or more states are determined based on the one or more transactions and a previous state;

a command for performing, by the test runner module, the test case in the legacy system by calling the transaction to the legacy system and by inputting the respective input value in the called transaction;

a command for performing, by the test runner module, the test case in the open system by calling the transaction to the open system and by inputting the respective input value in the called transaction; and a command for comparing, by a test result generating module, execution results of the test case in the legacy system and the open system respectively, wherein the execution results include a field that can contain data and the state generated by executing the test case.

* * * * *